(12) United States Patent
Odawara et al.

(10) Patent No.: US 12,352,247 B2
(45) Date of Patent: Jul. 8, 2025

(54) COAXIAL CIRCULATION POWER GENERATION DEVICE AND COAXIAL CIRCULATION POWER GENERATION METHOD

(71) Applicant: SCINET COMPANY LTD., Tokyo (JP)

(72) Inventors: Osamu Odawara, Tokyo (JP); Yasuo Miyazawa, Tokyo (JP)

(73) Assignee: SCINET COMPANY LTD., Tokyo (JP)

( * ) Notice: Subject to any disclaimer, the term of this patent is extended or adjusted under 35 U.S.C. 154(b) by 49 days.

(21) Appl. No.: 18/571,561

(22) PCT Filed: Dec. 13, 2021

(86) PCT No.: PCT/JP2021/045816
§ 371 (c)(1),
(2) Date: Dec. 18, 2023

(87) PCT Pub. No.: WO2023/112085
PCT Pub. Date: Jun. 22, 2023

(65) Prior Publication Data
US 2024/0280086 A1     Aug. 22, 2024

(51) Int. Cl.
*F03G 4/00* (2006.01)
*F01K 25/10* (2006.01)
(Continued)

(52) U.S. Cl.
CPC .............. *F03G 4/023* (2021.08); *F01K 25/10* (2013.01); *F03G 4/029* (2021.08); *F03G 4/037* (2021.08);
(Continued)

(58) Field of Classification Search
CPC ............... F24T 10/17; F03G 7/04–047; F03G 4/00–074
See application file for complete search history.

(56) References Cited

U.S. PATENT DOCUMENTS

| 3,961,866 A | 6/1976 | Nichols | |
| 4,426,849 A * | 1/1984 | Matthews | ................. F03G 7/04 417/379 |

(Continued)

FOREIGN PATENT DOCUMENTS

| CA | 3097273 A1 | 4/2021 |
| JP | 2002-256882 A | 9/2002 |

(Continued)

OTHER PUBLICATIONS

PCT/ISA/210, "International Search Report for PCT International Application No. PCT/JP2021/045816," Feb. 22, 2022.

(Continued)

*Primary Examiner* — Laert Dounis
(74) *Attorney, Agent, or Firm* — HAUPTMAN HAM, LLP (57) ABSTRACT

A coaxial circulation power generation device includes a moving medium reservoir adapted to be located in a pit formed in a heat source zone, a moving medium supply unit for supplying the moving medium to the moving medium reservoir, and a power generation unit for generating electricity from a driving force of the moving medium flowing between a low-temperature zone above and the high-temperature zone below the moving medium reservoir. The moving medium reservoir has an outer pipe connected to the moving medium supply unit and an inner pipe for circulating the moving medium, and the outer pipe and the inner pipe installed in the moving medium reservoir includes rotor (Continued)

blades that rotate in opposite directions with respect to a flow direction of the moving medium.

9 Claims, 5 Drawing Sheets

(51) Int. Cl.
*F24T 10/13* (2018.01)
*F24T 10/17* (2018.01)
*F24T 10/30* (2018.01)
(52) U.S. Cl.
CPC .............. *F24T 10/13* (2018.05); *F24T 10/17* (2018.05); *F24T 10/30* (2018.05); *Y02E 10/10* (2013.01)

(56) References Cited

U.S. PATENT DOCUMENTS

| | | |
|---|---|---|
| 2017/0051580 A1 | 2/2017 | Pierce et al. |
| 2021/0325090 A1 | 10/2021 | Pfutze-Ramsch |
| 2022/0049846 A1* | 2/2022 | Ioramashvili ........... F01K 11/02 |
| 2022/0082091 A1* | 3/2022 | Lu ........................... F01K 13/02 |
| 2024/0167461 A1* | 5/2024 | Hogg ...................... F03G 4/035 |

FOREIGN PATENT DOCUMENTS

| | | |
|---|---|---|
| JP | 2018-080664 A | 5/2018 |
| JP | 2018-200027 A | 12/2018 |
| JP | 2018-200161 A | 12/2018 |
| WO | 2010021618 A1 | 2/2010 |

OTHER PUBLICATIONS

Japan Patent Office, "Office Action for Japanese Patent Application 2002-517487," Jun. 7, 2022.

Extended European Search Report of European Application No. 21968008.9 dated Sep. 9, 2024, 8 pp.

\* cited by examiner

COAXIAL CIRCULATION POWER GENERATION DEVICE AND COAXIAL CIRCULATION POWER GENERATION METHOD

RELATED APPLICATIONS

The present application is National Phase of International Application No. PCT/JP2021/045816 filed Dec. 13, 2021, the disclosures of which are hereby incorporated by reference herein in its entirety.

TECHNICAL FIELD

The present invention relates to a coaxial circulation thermal power generation device and a coaxial circulation thermal power generation method, in which power is generated by a moving medium with enhanced circulation by indirectly utilizing heat from a thermal field. More particularly, it relates to a coaxial circulation power generation device and a coaxial circulation type power generation method that can improve the power generation efficiency of coaxial circulation power generation and facilitate the circulation function of coaxial circulation power generation by using carbon dioxide, etc. as a moving medium for heat energy, especially heat energy possessed by a thermal field.

BACKGROUND TECHNOLOGY

In recent years, due to the phenomenon of global warming and a sense of caution about nuclear power generation, renewable energy-related power generation, such as solar power, wind power, and geothermal power, has been attracting attention. Geothermal power generation uses semi-permanent heat energy from high-temperature magma reservoirs, and is one of the few types of power generation that does not derive from sun's nuclear fusion energy. Geothermal power generation does not depend on uranium, oil, coal, oil shale, natural gas, or other energy sources that will be depleted in the future. At the same time, geothermal power generation can help prevent global warming and air pollution, and its use is being expanded from the perspective of environmental protection and energy security.

From this perspective, a geothermal power generation system that can effectively utilize the heat obtained from a geothermal field in the earth and increase power generation efficiency has been proposed (e.g., Patent Document 1). Furthermore, in order to effectively utilize the heat obtained from the geothermal field by using a geothermal fluid above ground, a geothermal power generation system that can increase the heat retention capacity of the heat transfer pipe that transports the said moving medium has been proposed (e.g., Patent Document 2).

PATENT DOCUMENTS

Patent Document 1: Japanese Unexamined Patent Publication No. 2018-200161
Patent Document 2: Japanese Unexamined Patent Publication No. 2018-080664

SUMMARY OF THE INVENTION

Issues to be Resolved by the Invention
However, the geothermal power generation equipment and other devices described in the above patent documents do not have high power generation efficiency because they mainly use steam generated from hot springs and the like as the moving medium to utilize the heat obtained from the geothermal field above ground. Furthermore, steam, which is the moving medium after being used in the geothermal power generation system, is condensed, cooled, and returned to the ground through a return well, so the moving medium is not circulated and used. In many cases, steam generated from hot springs is used as the moving medium to utilize the heat obtained from the geothermal temperate zone above ground. Steam generated from the hot springs contains impurities such as sulfur derived from the components of the hot spring water. In addition, pH and composition of the moving medium vary depending on the geothermal environment that is used. Therefore, wells that supply heat responsible for power generation, as well as pipes and turbine blades that make up the power generation equipment, are affected by corrosion, erosion, corrosion fatigue, and scale adhesion. Due to these effects, the amount of power generation decreases over time, making it difficult to use the system for a long period of time. Therefore, an object of the present invention is to construct a power generation system that effectively utilizes the high-temperature energy that exists below a single well, either a production well or a return well, which is a pair of essential wells in a typical geothermal power generation system, in order to improve the power generation efficiency of power generation under conditions where the natural environment is varied, such as in a heat source zone. Another object of the present invention is to provide a coaxial circulating power generation system and a coaxial circulating power generation method with coaxial entry and exit holes that can circulate and use a moving medium that can be driven by large volume changes with small temperature differences, such as low-viscosity and chemically stable supercritical carbon dioxide.

Means to Resolve the Issues:

In order to achieve the above objectives, the present invention is (1) a coaxial circulation power generation device, comprising:
a moving medium reservoir located in a pit formed in a heat source zone,
a moving medium supply unit for supplying the moving medium to the moving medium reservoir, and,
a power generation unit that generates electricity from a driving force of the moving medium flowing between a low-temperature zone above and the high-temperature zone below the moving medium reservoir,
wherein the moving medium reservoir has an outer pipe connected to the moving medium supply unit and an inner pipe for circulating the moving medium, and
the outer pipe and the inner pipe installed in the moving medium reservoir are equipped with rotor blades that rotate in opposite directions with respect to the flow direction of the moving medium.

(2) The coaxial circulation power generation device according to (1), wherein the moving medium supply unit is equipped with a densification device to compress and cool the moving medium and change it to a high-density state.

(3) The coaxial circulation power generation device according to (1) or (2), wherein the moving medium reservoir is equipped with a heat accumulation mechanism.

(4) The coaxial circulation power generation device according to any one of (1) to (3), wherein the outer pipe includes a pipe structure mechanism in which an elastic force acts in the flow direction of the moving medium.

(5) The coaxial circulation power generation device according to any one of (1) to (4), wherein the moving medium is carbon dioxide.

(6) The coaxial circulation power generation device according to any one of (1) to (5), wherein the outer pipe and the inner pipe of the moving medium storage tank include a Laval nozzle on an upstream side of the rotary blade with the flow direction of the moving medium as an axis of rotation to thereby provide a flow velocity accelerating function of the moving medium.

(7) The coaxial circulation power generation device according to any one of (1) to (6), wherein the rotary blade has a power generation function including a rotary armature linking with rotation.

(8) A coaxial circulation power generation method comprises a process for supplying a moving medium to a moving medium reservoir located in a pit formed in a heat source zone, a process for conducting and circulating the moving medium, which has become supercritical by the time it reaches the bottom of the moving medium reservoir, above the heat source zone, and a process of coaxial circulation power generation by circulation of the moving medium which became supercritical.

Effects of the Invention

The present invention provides a coaxial circulation power generation device and a coaxial circulation power generation method that can improve the power generation efficiency of power generation by thermal energy from a heat source zone and circulate and use the moving medium.

EMBODIMENTS FOR IMPLEMENTING THE INVENTION

Hereinafter, exemplary embodiments of the present invention will be described in detail. However, the configurations, numerical values, processes, processing flows, etc. described in the following embodiments are merely examples, and the technical scope of the present invention is not intended to be limited to those descriptions.

First Embodiment

Figure 1:
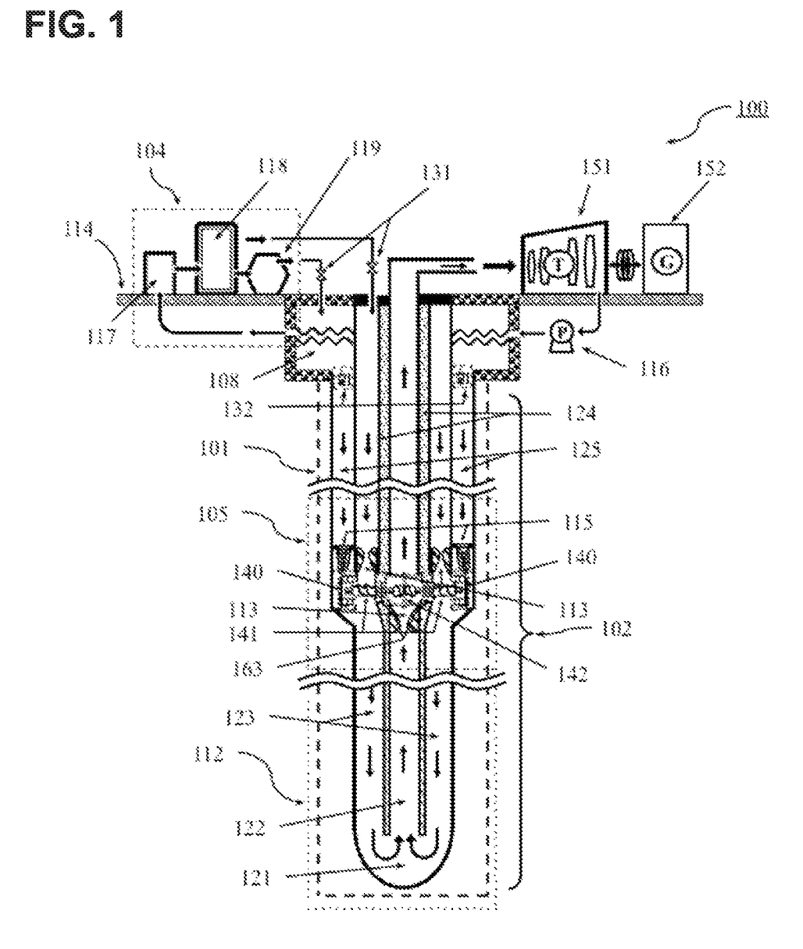
FIG. 1 is a schematic diagram showing an overview of a coaxial circulation power generation system of the first embodiment.

FIG. 1 is a diagram showing an outline of the power generation device of the first embodiment. As shown in FIG. 1, the coaxial circulation power generation device 100 of the present embodiment is arranged in the underground 111 formed in the heat source area 101. The coaxial circulation power generation device 100 includes a moving medium storage tank 102 arranged in a high-temperature region 112 below the heat source area 101. The moving medium storage tank 102 stores a moving medium that transforms from a solid to a liquid and further to a supercritical fluid under the high-temperature and high pressure formed by the high-temperature region 112 below the heat source area 101. Further, the power generation device 100 includes a moving medium supply unit 104 for supplying the moving medium to the moving medium storage tank 102. The moving medium supply unit is composed of a condenser 117 and a cooler 119. The moving medium storage tank 102 reduces the density of the moving medium in the supercritical state with heating in the outer pipe 123 for moving the moving medium supplied from the moving medium supply unit 104 to the bottom portion 121 and the low high-temperature region 112. The inner pipe 122 for leading the moving medium to the upper low-temperature region 114 of the heat source area 101 by the so-called thermal siphon action is provided. The thermal siphon action increases as the density change in the descent and ascent of the moving medium increases. The moving medium introduced from the low-temperature heat reservoir 108 passes through the rotary power generation unit 105 provided in the moving medium storage tank 102, and then descends through the outer pipe auxiliary layer 125 provided for merging and lowering into the outer pipe 123. The rotary power generation unit 105 has a ring shape that rotates with respect to the rotating ring 140 due to the downward flow of the moving medium in the outer pipe auxiliary layer 125 and the rotating ring 140 due to the downward flow of the moving medium in the outer pipe 123. The rotary blade 141 is provided, and the inside of the ring-shaped rotary blade 141 is linked with the rotary blade 142 that rotates by the ascending flow of the moving medium in the outer pipe 122. The outer periphery of the rotating circle 140, the outer and inner peripheries of the ring-shaped rotating blade 141, and the outer periphery of the rotating blade 142 are equipped with magnet armature 161 or coil armature 162 to convert rotational energy into electrical energy by electromagnetic induction action between armatures rotating in opposite directions on the same track.

The moving medium rising in the inner pipe 122 from the lower high-temperature region 112 to the upper low-temperature region 114 is supplied to the power generation unit 105. The power generation unit 105 includes a turbine 151 and a generator 152. The moving medium accelerated by the volume expansion due to the decrease in density rotates the turbine 151. The generator 152 generates electricity by converting the mechanical energy generated by the rotation of the turbine 151 into electrical energy. The moving medium used in the turbine 151 is recovered, compressed by the compression pump 116, passes through the low-temperature heat reservoir 108, is housed in the moving medium condenser 117, and is circulated.

As described above, according to the coaxial circulation power generation device 100 of the present embodiment, a closed space is formed inside the moving medium storage tank 102, and a large volume change and pressure change of the moving medium accompanying the phase change of the moving medium are utilized. By doing so, the power generation efficiency of thermal power generation can be improved. Further, the simultaneous circulation power generation device 100 can form a supercritical state of the moving medium at the bottom 121 of the moving medium storage tank 102 arranged in the high-temperature region 112 below the heat source area 101. For this reason, the power generation system 100 can smoothly move and circulate the moving medium without installing a separate device such as a high-pressure pump, which is necessary to conduct the low-density moving medium to the upper low-temperature region 114 by forming a supercritical state of the moving medium.

Figure 2:
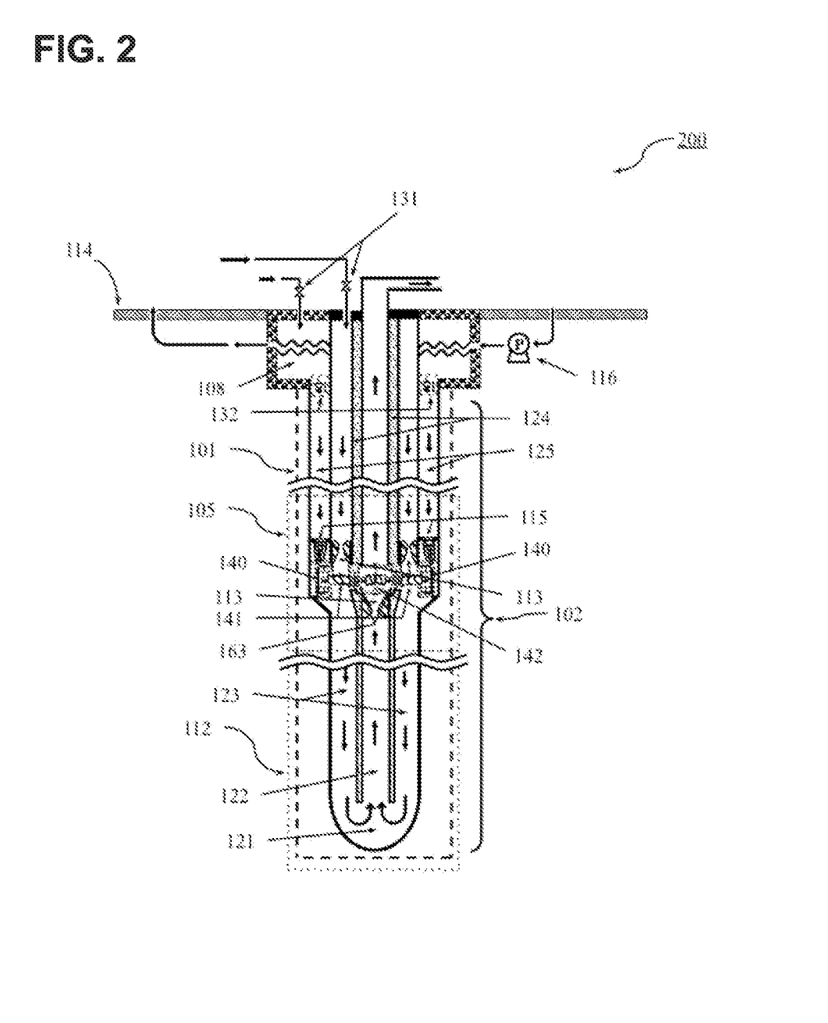
FIG. 2 is a diagram showing a cross section of a moving medium storage layer included in the coaxial circulation power generation device of the first embodiment.

FIG. 2 is a diagram showing a cross section 200 of the moving medium storage tank 102 included in the power generation device 100 of the present embodiment. As shown in FIG. 2, the cross section 200 of the moving medium storage tank includes the outer pipe 123 and the inner pipe 122, and has an outer pipe auxiliary layer 125 above the rotary power generation unit 105 arranged in the moving medium storage tank 102. The inner pipe heat insulating layer 124 is provided. Further, the moving medium storage tank 102 may adopt a double pipe structure composed of the outer pipe 123 and the inner pipe 122, or further provide another inner pipe between the outer pipe 123 and the inner pipe 122. It may have a multi-pipe structure.

The outer pipe 123 is connected to the moving medium supply unit 104. The outer pipe auxiliary layer 125 formed along the outside of the outer pipe 123 is connected to the moving medium supply unit 104. The moving medium, which is densified and supplied via the injection pump 119 of the moving medium supply unit 104, and the supplied moving medium descends to generate rotational power from the telescopic pipe structure portion 115. It constitutes a flow path that passes through the portion and joins the outer pipe 123.

In the rotary power generation unit 105 horizontally arranged in the flow path of the downward flow and the upward flow of the moving medium, the rotary ring is used to give angular momentum to the moving medium that descends from the outer pipe auxiliary layer 125 and flows into the rotary ring 140. A telescopic pipe structure 115 is provided on the upstream side of the rotary ring 140 to convert the fluid energy of the moving medium into rotational energy. The outer pipe 123 accelerates the falling moving medium by passing it through the Laval nozzle portion 113 provided on the upstream side of the ring-shaped rotary blade 141 arranged inside the rotary ring 140, and rotates and moves the ring-shaped rotary blade 141 to converts the fluid energy of the medium into rotational energy. Further, the moving medium ascending in the inner pipe 122 is accelerated by passing through the Laval nozzle 113 arranged in the inner pipe 122, and the rotation of the rotary blade 142 arranged on the downstream side is guided. In order to efficiently convert the energy of the downward flow and the upward flow of the geothermal fluid into electrical energy, the rotation directions of the rotary ring 140 and the ring-shaped rotary blade 141, and the ring-shaped rotary blade 141 and the rotary blade 142 are set to reverse rotations, respectively. Both rotational forces are transmitted to the rotor to generate electric power. By rotating in opposite directions in this way and transmitting the rotational power to the inner and outer double rotors, the relative speed between the two rotors is doubled and the power generation performance is improved.

For example, when the vapor pressure of the moving medium is high, the state of the moving medium changes from solid to liquid. On the other hand, when the vapor pressure of the moving medium is low, the state of the moving medium changes from a solid to a liquid and then from a liquid to a gas. In the region of high-temperature and high pressure, the boundary between gas and liquid disappears, and it behaves as a fluid (supercritical fluid) with properties intermediate between gas and liquid. The moving medium that has passed through the low-temperature heat reservoir 108 in the compressed state passes through the flow path formed inside the outer pipe 123, which has been densified, and changes its state by the time it reaches the bottom 121 of the moving medium storage tank. It becomes a high-density supercritical moving medium under a high-pressure environment formed by accelerating the volume expansion of a closed space. At the bottom 121, the density of the supercritical moving medium is reduced by heating in the lower high-temperature and high-pressure region 112, and the so-called thermos syphon effect accelerates the drawing-in of the moving medium from the outer pipe 123 to raise the moving medium above the low-temperature.

The outer pipe 123 extends underground from the upper low-temperature region 114 of the heat source area 101. The bottom 121 of the outer pipe 123 should reach the high-temperature region 112 below the heat source area 101. For example, if it is placed vertically in the underground 111, it is preferable to have a length where a pressure greater than the critical pressure acts on the moving medium at the bottom 121.

The inner pipe 122 is a pipe for leading the supercritical moving medium from the bottom 221 of the moving medium storage tank 102 to the upper atmosphere open area 114 of the heat source area 101. In FIG. 2, the inner pipe heat insulation layer 124 is formed around the inner pipe 122 downstream from the rotating power generation section 105 formed in the moving medium reservoir 102 to maintain the high-temperature environment of the rising moving medium.

The moving medium that passes through the inner pipe 122 as an upward flow provides fluid energy for the turbine drive installed above. The mechanical energy generated by the turbine drive is converted into electrical energy.

There are no restrictions on the moving medium, as long as it is a substance that can undergo a state change and eventually become a gas in the system of the moving medium reservoir. For example, if the moving medium is a substance that can change its state from solid to gas under the conditions that can be taken in the system of the moving medium reservoir, the range of density change associated with the state change will be large. As a result, the pressure change in the system of the moving medium reservoir becomes extremely large, and more mechanical energy can be generated by the fluid.

Examples of moving medium include, but are not limited to, carbon dioxide, water, low-molecular-weight hydrocarbons such as methane, ethane, propane, butane, pentane, and hexane, olefinic hydrocarbons such as ethylene, propylene, butylene, pentene, and hexene, halogenated hydrocarbons, ammonia, methanol, ethanol, acetone, and mixtures thereof.

Among these substances, carbon dioxide and water are preferable since they can form a supercritical state. Carbon dioxide is a supercritical fluid substance. Supercritical fluid substances have properties that are intermediate between liquid and gas states. In other words, a supercritical fluid substance has both a density of liquid and a fluidity that a gas has. For this reason, the density of supercritical fluid materials changes significantly with small changes in pressure or temperature. Therefore, supercritical fluid materials can be said to be a heat moving medium that can change heat into electrical energy with less workload.

In addition, supercritical carbon dioxide is chemically inert, non-corrosive, and has a larger diffusion velocity than water. For this reason, carbon dioxide is preferable as a heat moving medium used in this geothermal power generation system. In other words, carbon dioxide can be understood as a heat moving medium that can convert thermal energy into electrical energy with less workload.

Furthermore, supercritical fluid materials have a density almost equal to that of a liquid. Therefore, only a small amount of pumping power is required by the compressor of the turbine, which is the power generator, and the energy required for power generation can be saved. In particular, the density of supercritical carbon dioxide at its critical point is about half with respect to that of water at the same temperature. Therefore, carbon dioxide can be compressed more easily than in the vapor state, and the amount of work done in the compression stage can be greatly reduced.

Thus, the coaxial circulation power generation device of this form can circulate and use the heat moving medium in the system of the device. In addition, the coaxial circulation power generation device of this embodiment can also reduce the labor required to recover the supercritical moving medium used to reach the heat moving medium and heat source for power generation. In particular, by using supercritical carbon dioxide as the moving medium for heat, the coaxial circulation power generation system can function with smaller and less expensive compressor and turbines than power plants use. Furthermore, by using supercritical carbon dioxide as the heat moving medium, the coaxial circulation power generation system of this embodiment enables the configuration of a compact and very efficient power generation system. The turbine provided by the coaxial circulation power generation system can be designed to be simpler with several turbine stages and associated piping systems.

Second Embodiment

The coaxial circulation power generation device of this embodiment is similar to the coaxial circulation power generation device of the first embodiment, except that it is equipped with a densification device to change the moving medium collected in the closed circulation process to a high-density state. The following describes the densification device for the moving medium, which is a characteristic part of the coaxial circulation power generation device of this embodiment.

Figure 3:
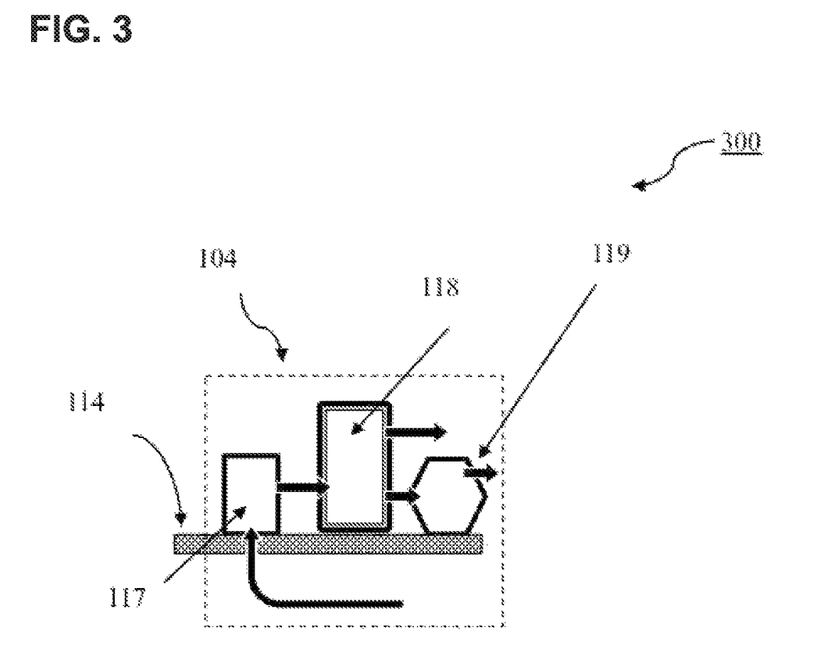
FIG. 3 is a diagram showing the structure of a moving medium densification device included in the coaxial circulation power generation device of a second embodiment.

FIG. 3 shows an overview 300 of the moving medium supply section, which is responsible for the densification of the moving medium that the power generation system is equipped with. As shown in FIG. 3, densification of the moving medium is achieved by the condenser 117 and the injection pump 119. As shown in FIG. 3, the densification of the moving medium is achieved by the condenser 117 and the injection pump 119, which change the moving medium from a gaseous state to a condensed state with higher density.

The moving medium supply unit 104 supplies the densified moving medium to the moving medium storage tank. The moving medium supply unit 104 supplies the densified moving medium to the moving medium storage tank 102.

The moving medium feed section 104 produces densified moving medium from the moving medium reservoir 102, which passes through the turbine 151. The moving medium feed section 104 produces densified moving medium from the moving medium storage tank 102 by using the moving medium recovered in the closed circulation process through the turbine 151 as raw material. After passing through the turbine 151, the recovered moving medium is cooled and pressurized in the moving medium supply section 104 to produce a condensed moving medium. After passing through the turbine 151, the collected moving medium is cooled and pressurized in the moving medium supply section 104 to become densified and condensed moving medium.

The moving medium condensed by the moving medium condenser 117 is once stored in the moving medium storage tank 118 and then supplied to the low-temperature heat accumulation section 108 via the injection pump 119.

Third Embodiment

The coaxial circulation power generation device of this embodiment is the same as the coaxial circulation power generation device of the above embodiment, except that the moving medium storage tank is equipped with a heat accumulation mechanism. The low-temperature heat accumulation section, which is a characteristic part of the heat accumulation mechanism of the coaxial circulation power generation device of this embodiment, is described below.

Figure 4:
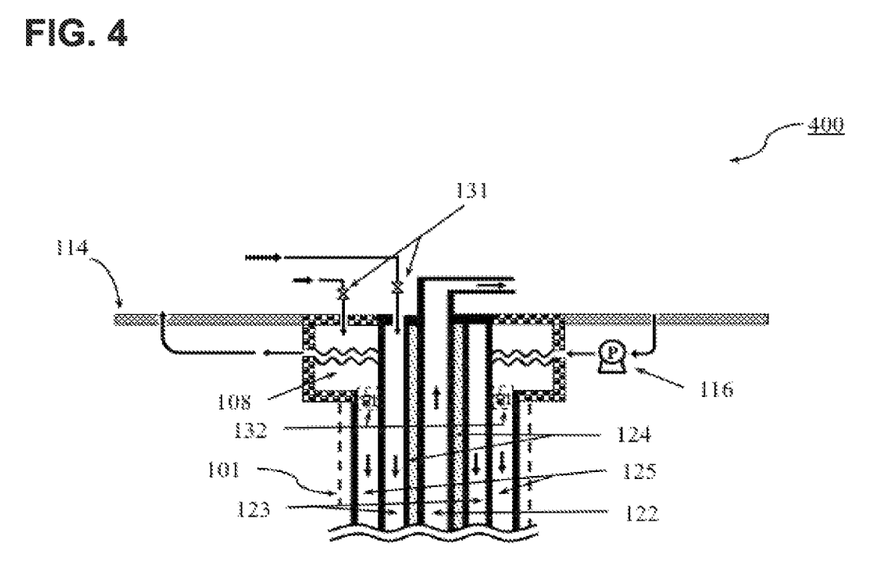
FIG. 4 is a diagram showing an outline of a heat storage mechanism included in the coaxial circulation power generation device of a third embodiment.

FIG. 4 shows a model 400 of the heat accumulation mechanism that the moving medium reservoir has. As shown in FIG. 4, the low-temperature heat storage section 108, which operates as the heat storage mechanism, has a passage for the moving medium recovered from the turbine 151 and compressed by the compression pump 116. In addition, it is equipped with a passageway for the moving medium recovered from the turbine 151 and compressed by the compression pump 116, and an external valve for supplying the moving medium from the moving medium supply section through the flow control valve 131 to the heat source 101. It is configured to connect to the outer pipe auxiliary layer 125 for supplying the heat source area 101.

Fourth Embodiment

The coaxial circulation power generation device of this embodiment is the same as the power generation device of the above embodiment, except that it has a pipe structure in which an elastic (expansion and contraction) force is applied by an Origami technique in the outer pipe auxiliary layer to improve the rotation efficiency of the rotating annulus constituting the rotary power generation unit. The following is an explanation of the pipe structure on which the expansion and contraction force acts, which is a characteristic part of the coaxial circulation power generation device of this embodiment.

Figure 5:
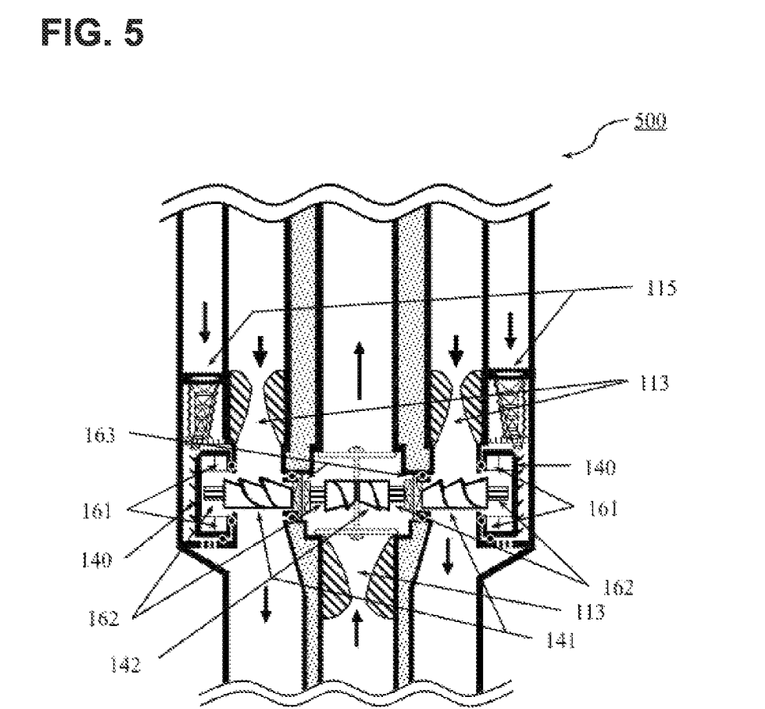
FIG. 5 is a diagram showing an overview of the rotating power generation section of the coaxial circulating power generator with pipe structure function and flow acceleration function of the fourth to sixth embodiments.

FIG. 5 shows a cross-section of the pipe structure 500, which is a component of the rotary power generation unit 105 provided in the power generation device of the present embodiment. The cross section shows the rotary power generation unit 105 including the pipe structure 500 where the elastic force by the Origami technique acts is arranged upstream of the outer pipe auxiliary layer 125, which is the flow path of the moving medium acting on the rotation of the rotating ring 140. As shown in FIG. 5, the pipe structure 500 includes a portion in which a compressive force acts inside the inner pipe comprised of inner wall and an inner wall. The portion is provided with a telescopic portion that can expand and contract according to the pressure inside the inner pipe. As shown in FIG. 5, in the rotary power generation unit 105, which is arranged horizontally in the downward and upward flow paths of the moving medium, the angular momentum is transferred to the moving medium that descends from the outer pipe auxiliary layer 125 and flows into the rotating ring 140. A telescopic pipe structure is provided upstream of the rotating ring 140 to convert the fluid energy of the moving medium into rotational energy. The outer pipe 123 converts the falling moving medium into a ring-shaped rotor blade 141. The moving medium falling from the outer pipe 123 is accelerated by passing through the Laval nozzle 113 provided on the upstream side of the ring-shaped rotating blade 141 arranged inside the rotating ring 140, and rotates the ring-shaped rotating blade 141. The fluid energy of the moving medium is converted into rotational energy. The pipe structure 115, which is subjected to expansion and contraction force by the origami technique formed in the outer pipe auxiliary layer 125, efficiently acts on the rotation of the rotating ring 140, It provides the moving medium with angular momentum that acts efficiently on the rotation of the rotating ring 140. In addition, the moving medium ascending in the inner pipe 122 is accelerated by passing through the Laval nozzle 113 arranged in the inner pipe 122, and induces the rotation of the rotary blade 142 located downstream. In order to efficiently convert the energy of the downward and upward flows of the moving medium into electrical energy, the rotation directions of the rotary ring 140 and the ring-shaped rotary blade 141, and the ring-shaped rotary blade 141 and the rotary blade 142 are set to reverse rotation, respectively. Both rotational forces are transmitted to the rotor to generate electric power. By rotating in opposite directions in this way and transmitting the rotational power to the inner and outer double rotors, the relative speed between the two rotors is doubled and the power generation performance is improved.

Fifth Embodiment

The coaxial circulation power generation device of the present embodiment is the same as the power generation device of the above embodiment except that the inner pipe is provided with a Laval nozzle. Hereinafter, the Laval nozzle, which is a characteristic part of the coaxial circulation power generator of this embodiment, will be explained below. The moving medium storage tank provided by the Laval nozzle of the power generation unit of this embodiment includes an inner pipe and an outer pipe. The outer pipe comprises an inner wall and an outer wall. The Laval nozzle, which is a characteristic portion of the coaxial circulation power generation device of the present embodiment, can accelerate the flow of the mobile medium by providing a portion in which a part of the flow path through which the mobile medium passes is narrowed. The form of the Laval nozzle provided by the coaxial circulation power generation system is not limited, as long as it is equipped with a narrowed portion of the flow path through which the moving medium passes. Only one or several Laval nozzle structures may be provided in the outer pipe, and the nozzle outlet shape may be not only circular but also partially circular. The part of the flow path that is narrowed may have a step portion that is not narrowed, or it may be configured to be narrowed by gently drawing a curve.

Sixth Embodiment

In the coaxial circulation power generation device of the present embodiment, the rotary ring 140 provided in the rotary power generation unit 105 of the moving medium storage tank 102, the ring-shaped rotary blade 141, and the magnet armature 161 and the coil armature 162 attached to the rotary blade 142 are provided. The geothermal power generation device is the same as the geothermal power generation device of the above embodiment, except that the rotational energy is converted into electrical energy by the electromagnetic induction action between the 161 and 162 armatures. Hereinafter, the rotary power generation unit, which is a characteristic part of the geothermal coaxial circulation power generation device of the present embodiment, will be described.

The rotating power generation unit 105 includes a ring-shaped rotary blade 141 having a rotating circular ring 140 with a magnet armature 161 on the inner circumference that rotates by the downward flow of the moving medium in the outer pipe auxiliary layer 125, and a coil armature 162 on the outer periphery rotating in the reverse direction with respect to the rotating circular ring 140 by the downward flow of the moving medium in the outer pipe 123. Further, a coil armature 162 is provided on the rotating blade 142 rotating by the upward flow of the moving medium in the outer pipe 122.

The magnet armature 161 or coil armature 162 provided on the outer peripheral portion of the rotating circular ring 140, the outer peripheral portion and the inner peripheral portion of the ring-shaped rotary blade 141, and the outer circumference of the rotor blade 142 should efficiently utilize the reverse rotation of the same trajectory to act electromagnetic induction between the armatures, and there is no restriction on their arrangement. Further, with respect to the rotation linking portion 163 of the ring-shaped rotary blade 141 and the rotary blade 142, if the outer pipe and the inner pipe are separated, a magnetic gear mechanism or a bearing mechanism may be used, and there is no particular restriction on this.

Further, the magnetic flux density is arranged by doubling the relative speed between the rotors due to the reverse rotation of the rotating ring 140 and the ring-shaped rotating blade 141, and the ring-shaped rotating blade 141 and the rotating blade 142, respectively. It suffices to improve the power generation performance as a larger Halbach array type or axial gap type, and it is not always necessary to use neodymium magnets, etc., but general ferrite magnets may be selected.

Seventh Embodiment

The coaxial circulation power generation method of the present embodiment includes the following steps: (1) the process of supplying a moving medium to a moving medium storage tank located in a high-temperature region below the heat source zone, (2) the process of deriving the moving medium that has become supercritical by the time it reaches the bottom of the moving medium storage tank above the heat source zone, and (3) the process of coaxial circulation power generation using the supercritical moving medium. Each process is described below.
(The Process of Supplying a Moving Medium to a Moving Medium Storage Tank.)

This coaxial circulation power generation method of the present embodiment includes a process of supplying a moving medium to a moving medium storage tank. The condensed moving medium is supplied from the moving medium supply unit to the moving medium storage tank. The moving medium passes through a path formed from an outer pipe formed inside the moving medium storage tank, descends while accelerating through repeated low-density and volume expansion, and reaches the lower portion of the high-pressure environment to become supercritical. The density of the supercritical moving medium is reduced by exposure to the high-temperature region at the bottom of the moving medium storage tank.

(The Process of Deriving the Supercritical Moving Medium Above the Heat Source Zone)

The power generation method of the present embodiment further includes a process of deriving the supercritical moving medium above the heat source zone. The low-density supercritical moving medium is conducted to the upper low-temperature region through the path formed from the inner pipe formed inside the moving medium storage tank by thermos-syphon action.

(The Process of Generating Electricity Using a Supercritical Moving Medium)

The power generation method of the present embodiment includes the process of geothermal power generation using a supercritical moving medium. The fluid energy of the supercritical moving medium is converted into mechanical energy by a turbine provided in the power generation unit of the power generation device. Furthermore, the mechanical energy converted by the turbine is converted into electrical energy by the generator provided in the power generation unit.

Other Embodiments

The invention of the present application has been described above with reference to the embodiments, but the present application is not limited to the above embodiments. Various changes can be made to the configuration and details of the present invention within the scope of the present invention as may be understood by those skilled in the art. Also, devices or processes that combine the separate features contained in each embodiment in any way are included in the scope of the present invention.

The geothermal power generation device of the present invention can contribute to the development of the energy industry because it can effectively use the thermal energy heat source zones. In addition, the power generation equipment of the present invention uses a supercritical fluid substance as the heat moving medium, and since the heat moving medium can be used in circulation, it can provide clean energy that is friendly to the global environment. Furthermore, the power generation device can be effectively used not only on Earth but also on other planets such as Mars having heat sources.

LABEL DESCRIPTION 100 power generator
101 heat source zone
102 moving medium storage tank
104 moving medium supply unit
105 rotary power generation unit
108 low-temperature heat reservoir
111 underground pit
112 bottom-side high-temperature zone
113 Laval nozzle section (injection well)
114 upper-side low-temperature zone
115 telescopic pipe structure
116 Compression Pump
117 moving medium Condenser
118 moving medium storage tank
119 Injection Pump
121 Borehole bottom
122 Inner pipe (recovery well)
123 Outer pipe (injection well)
124 insulation layer
131 flow control valve
132 check valve
141 ring-shaped rotor
142 rotor blade
151 Turbine
152 Generator
161 magnet armature
162 coil armature
163 rotary linkage

What is claimed is:

1. A coaxial circulation power generation device, comprising:
    a moving medium reservoir adapted to be located in a pit formed in a heat source zone,
    a moving medium supply unit for supplying a moving medium to the moving medium reservoir, and,
    a power generation unit for generating electricity from a driving force of the moving medium flowing between a low-temperature zone of the heat source zone above the moving medium reservoir and a high-temperature zone of the heat source zone below the moving medium reservoir, wherein
    the moving medium reservoir has
        an outer pipe connected to the moving medium supply unit, and
        an inner pipe for circulating the moving medium,
    the outer pipe and the inner pipe installed in the moving medium reservoir includes rotor blades that rotate in opposite directions with respect to a flow direction of the moving medium,
    the moving medium reservoir further has an outer pipe auxiliary layer extending along an outer side of the outer pipe at an upstream of the power generation unit and merging with the outer pipe at a downstream of the power generation unit, and
    the outer pipe auxiliary layer includes a telescopic pipe structure, on the upstream of the power generation unit, configured to expand and contract according to a pressure of the moving medium, and convert fluid energy of the moving medium into rotational energy to rotate the power generation unit.

2. The coaxial circulation power generation device according to claim 1, wherein
    the moving medium supply unit includes a densification device for compressing and cooling the moving medium to change the moving medium to a high-density state.

3. The coaxial circulation power generation device according to claim 1, wherein
    the moving medium reservoir includes a heat storage mechanism.

4. The coaxial circulation power generation device according to claim 1, wherein
    the telescopic pipe structure is configured to cause an elastic force to act in the flowing direction of the moving medium.

5. The coaxial circulation power generation device according to claim 1, wherein
    the moving medium is carbon dioxide.

6. The coaxial circulation power generation device according to claim 1, wherein
    the outer pipe and the inner pipe of the moving medium reservoir include a Laval nozzle on an upstream side of the rotor blades with the flow direction of the moving medium as an axis of rotation to thereby provide a flow velocity accelerating function of the moving medium.

7. The coaxial circulation power generation device according to claim 1, wherein
each of the rotor blades has a power generation function formed of a rotary armature that is linked to rotation.

8. The coaxial circulation power generation device according to claim 1, wherein
the moving medium supply unit includes
a densification device, having a condenser and an injection pump, configured to compress and cool the moving medium to change the moving medium in a gaseous state to a state with a density higher than that of the gaseous state, and
a moving medium storage tank arranged between the condenser and the injection pump, wherein the moving medium storage tank includes
a first path configured to supply the moving medium to the outer pipe auxiliary layer through the injection pump, and
a second path configured to supply the moving medium directly to the outer pipe.

9. The coaxial circulation power generation device according to claim 8, further comprising:
a heat reservoir configured to receive the moving medium from the injection pump through the first path and supply the moving medium to the outer pipe auxiliary layer.

* * * * *